Oct. 10, 1950      C. E. BASTON      2,525,472
TURBINE-ELECTRIC LOCOMOTIVE CONTROL SYSTEM
Filed Aug. 28, 1947
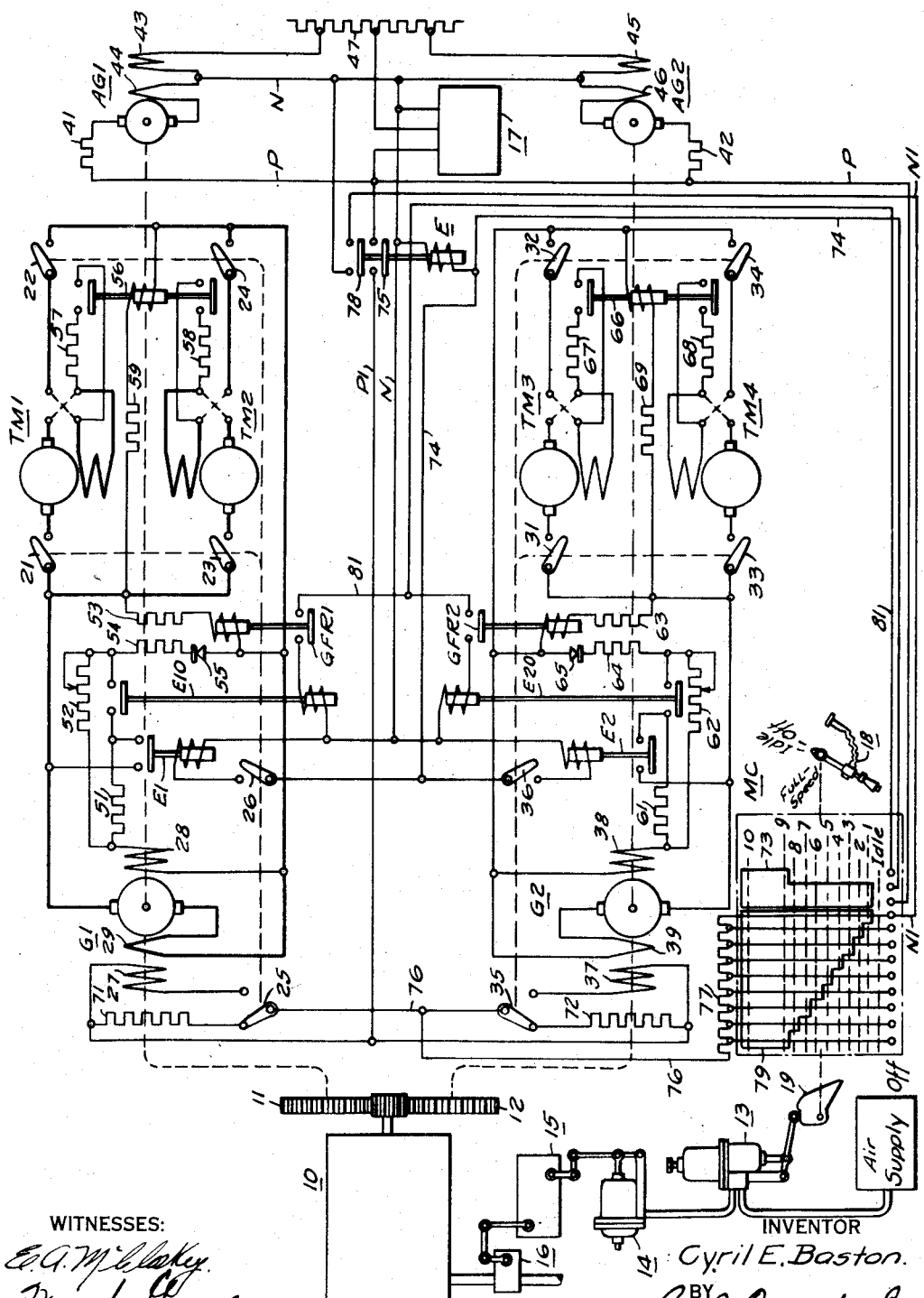
WITNESSES:
INVENTOR
Cyril E. Baston.
BY
ATTORNEY Patented Oct. 10, 1950

2,525,472

UNITED STATES PATENT OFFICE 2,525,472

TURBINE-ELECTRIC LOCOMOTIVE CONTROL SYSTEM

Cyril E. Baston, Irwin, Pa., assignor to Westinghouse Electric Corporation, East Pittsburgh, Pa., a corporation of Pennsylvania Application August 28, 1947, Serial No. 771,036

7 Claims. (Cl. 290—17)

My invention relates, generally, to control systems and, more particularly, to systems for controlling the operation of turbine-electric locomotives in which the traction motors are supplied with current from generators driven by steam turbines.

Because of the inherent differences in the operating characteristics of a Diesel engine and a steam turbine, a control system of the type usually utilized for a Diesel-electric locomotive is not suitable for a turbine-electric locomotive. The idling speed of a Diesel engine is about 25% of its full speed, whereas, the idling speed of a steam turbine is about 60% of its full speed. Therefore, it is necessary to obtain the acceleration of a turbine-electric locomotive by a different system from that utilized for a Diesel-electric locomotive.

An object of my invention, generally stated, is to provide a control system for a turbine-electric locomotive which shall be simple and efficient in operation and which may be economically manufactured and installed.

A more specific object of my invention is to so correlate the turbine speed and the generator excitation that the desired rate of acceleration of a turbine-electric locomotive is obtained.

Another object of my invention is to prevent the generation of an excessive voltage during the acceleration of a turbine-electric locomotive.

A further object of my invention is to provide for disconnecting any generator and its affiliated traction motors from the power system of a turbine-electric locomotive having a plurality of generators driven by the same turbine.

Other objects of my invention will be explained fully hereinafter or will be apparent to those skilled in the art.

In accordance with one embodiment of my invention, a plurality of generators are driven by a turbine and each generator supplies power to two traction motors connected in parallel-circuit relation. The power supplied to the motors is controlled by a master controller which controls both the generator excitation and the turbine speed. During the first part of the accelerating cycle, the generator excitation is increased by increments and during the latter part, the speed of the turbine is increased to its full speed by further movement of the controller handle.

For a better understanding of the nature and objects of my invention, reference may be had to the following detailed description, taken in conjunction with the accompanying drawing, in which the single figure is a diagrammatic view of a control system embodying the principal features of my invention.

Referring to the drawing, the system shown therein comprises a prime mover 10 which is preferably a steam turbine, main generators G1 and G2 which are driven by the prime mover 10 through gears 11 and 12, respectively, auxiliary generators AG1 and AG2 which are also driven by the prime mover 10, traction motors TM1 and TM2 which are supplied with current by the main generator G1, traction motors TM3 and TM4 which are supplied with current by the generator G2, a master controller MC, a regulating valve 13, a governor actuator 14, a governor 15, a throttle 16 for controlling the speed of the prime mover, and a voltage regulator 17 for regulating the voltage of the auxiliary generators AG1 and AG2. The voltage regulator 17 may be of a standard type and, therefore, need not be described in detail in the present application. Likewise, the regulating valve 13, the governor actuator 14, the governor 15 and the throttle 16 may be standard types of equipment well known in the art.

As shown, the master controller MC is provided with a notching mechanism 18 which is of the type described in my copending application, Serial No. 771,037, filed August 28, 1947. The notching mechanism and the controller are so constructed that when the controller handle is moved from the "off" position to the "idle" position, a cam 19 operates the regulating valve 13 which, in turn, causes the actuator 14 to adjust the governor 15 to open the throttle 16 to cause the turbine 10 to be brought up to the idling speed. When the controller is moved from the "idle" position toward the "full speed" position the excitation of the generators G1 and G2 is increased in a manner which will be described more fully hereinafter.

The motors TM1 and TM2 may be connected across the generator G1 in parallel-circuit relation by closing motor cutout switches 21, 22, 23 and 24. Switches 25 and 26 are also associated with these motor cutout switches and are closed at the same time as the motor cutout switches. Likewise, the motors TM3 and TM4 may be connected across the generator G2 in parallel-circuit relation by closing motor cutout switches 31, 32, 33 and 34. Switches 35 and 36 are closed simultaneously with these latter motor cutout switches.

The main generator G1 is provided with a separately-excited field winding 27, a self-excited field winding 28, and a commutating field winding 29. Likewise, the generator G2 is provided with a separately-excited field winding 37, a self-excited field winding 38, and a commutating field winding 39.

A switch E is provided for connecting the auxiliary generators AG1 and AG2 to the separately-excited field windings 27 and 37. As shown, the auxiliary generators AG1 and AG2 are parallelled through balancing resistors 41 and 42. The auxiliary generator AG1 is provided with a self-excited field winding 43 and a commutating field winding 44. The auxiliary generator AG2 is provided with a self-excited field winding 45 and commutating field winding 46. As previously explained, the voltage of the auxiliary generators is regulated by the voltage regulator 17 and a resistor 47 which is associated with the voltage regulator 17.

A switch E1 is provided for connecting the self-excited field winding 28 across the armature of the generator G1 in series-circuit relation with a resistor 51. A switch E10 is provided for connecting a resistor 52 in parallel-circuit relation with a resistor 51. The operation of the switch E10 is controlled by a relay GFR1, the actuating coil of which is connected across the generator G1 in series-circuit relation with the resistor 53.

The resistor 51 functions to prevent the generator G1 from developing an excessive voltage when the locomotive is being started and the field windings of the generator are cold and have a relatively low resistance. After the separately excited field windings have reached their maximum excitation, and the generator voltage is sufficiently high to operate the relay GFR1, the switch E10 is closed to connect the resistor 52 in parallel with the resistor 51, thereby reducing the external resistance in the circuit for the field winding 28, the internal resistance of which is increased by the increase in temperature of the field windings. In this manner, the voltage of the generator is prevented from becoming excessive at any time during the operation of the locomotive. A field discharge resistor 54 is connected across the field winding 28 through a rectifying unit 55 to prevent an excessive voltage when the field circuit is open.

In a similar manner, a switch E2 connects the self-excited field winding 38 across the generator G2 in series-circuit relation with a resistor 61. A switch E20 connects a resistor 62 in parallel-circuit relation with the resistor 61 when a relay GFR2 is energized in a manner similar to the relay GFR1. The actuating coil of the relay GFR2 is connected across the generator G2 in series-circuit relation with a resistor 63. A field discharge resistor 64 is connected across the field winding 38 through a rectifying unit 65.

A field shunting switch 56 is provided for shunting the field windings of the motors TM1 and TM2 through resistors 57 and 58, respectively. The actuating coil of the switch 56 is connected across the motors through a resistor 59. Therefore, the switch 56 is responsive to the voltage of the motors and functions to shunt the motor field at a predetermined speed in a manner well known in the art.

Likewise, a field shunting switch 66 is provided for shunting the field windings of the motors TM3 and TM4 through resistors 67 and 68, respectively. The actuating coil of the switch 66 is connected across these motors through a resistor 69.

In order that one generator, for example G1, and its affiliated motors may be cut out of service in the event of trouble without disturbing the operation of the other generator and its associated motors, the switches 25 and 26 function to remove the excitation from the generator G1 when the motor cutout switches 21 to 24, inclusive, are open to disconnect the motors TM1 and TM2. The switch 26 opens the circuit for the actuating coil of the switch E1, thereby removing the self-excitation from the generator G1. The switch 25 opens the circuit for the field winding 27, thereby removing the separate excitation from the generator G1.

When the circuit for the field winding 27 is open, the switch 25 is actuated to a position in which it connects a resistor 71 in the place of the field winding 27. It will be understood that by making the resistance of the resistor 71 substantially the same as the resistance of the field winding 27 and substituting the resistor 71 for the field winding 27 in the circuit for the separately-excited field windings of both generators, the excitation of the generator G2 will not be affected by disconnecting the field winding 27 of the generator G1 from the excitation circuit.

Likewise, the switches 35 and 36 function to remove excitation from the generator G2 in case the motors TM3 and TM4 are cut out of service. A resistor 72 is substituted for the field winding 37 in the excitation circuit in the same manner as the resistor 71 is substituted for the field winding 27.

In order that the functioning of the foregoing apparatus may be more clearly understood, the operation of the system will now be described in more detail. Assuming that the motor cutout switches 21 to 24, inclusive, and 31 to 34, inclusive, have been closed, the locomotive may be started by actuating the handle of the controller MC from the "off" to the "idle" position, thereby admitting steam to the turbine 10 and bringing it to the idling speed as previously explained. When the controller handle is moved from the "idle" position to the first one of the notching positions, the switches E, E1 and E2 are closed to supply excitation to the generators G1 and G2. The energizing circuit for the switch E may be traced from the positive conductor P through a segment 73 on the controller MC, conductor 74 and the actuating coil of the switch E to the negative conductor N. The energizing circuit for the switch E1 extends from the conductor 74 through the switch 26 and the actuating coil of the switch E1 to the negative conductor N. The circuit for the switch E2 extends from the conductor 74 through the switch 36 and the actuating coil of the switch E2 to the negative conductor N.

The closing of the switch E connects the separately excited field windings 27 and 37 to the power conductors P and N which, as previously explained, are energized by the auxiliary generators AG1 and AG2. The energizing circuit for field winding 27 extends from the positive conductor P through contact members 75 of the switch E, conductor P1, the field winding 27, the switch 25, conductor 76, a resistor 77, conductor N1, and contact members 78 of the switch E to the negative conductor N. The energizing circuit for the field winding 37 extends from the conductor P1 through the field winding 37, the switch 35, the conductor 76, and the resistor 77 to the conductor N1.

When the controller MC is actuated to the second one of the notching positions, a portion of the resistor 77 is shunted from the circuit for the separately excited field windings 27 and 37 by a segment 79 on the controller, thereby increasing the excitation of the generators G1 and G2. The excitation of the generators may be increased by increments by actuating the controller MC through the notching positions to shunt the resistor 77 step-by-step, thereby increasing the voltage of the generators.

The cam 19 may be so constructed that the speed of the turbine 10 is increased only a relatively small amount, while the separate excitation of the generators is being increased. By way of example, the turbine speed may be increased from 60%, which is its idling speed, to 75% during the notching operation of the controller.

When the controller is moved to the last of the notching positions, or position 9 as shown in the present drawing, the resistor 77 is shunted from the excitation circuit by the segment 79 on the controller MC. Thus, maximum separate excitation is applied to the generator.

At this time, a conductor 81 is energized through the segment 73 on the controller MC, thereby establishing a circuit to the contact members of the relays GFR1 and GFR2. When these relays are closed as a result of the generator voltages having attained a predetermined voltage, the switches E10 and E20 are closed to reduce the external resistance in the circuits for the self-excited field windings of the generator.

Thus, by moving the controller handle to the "full speed" position, thereby increasing the speed of the turbine to its full speed, the voltage of the generators is increased as a result of the increase in the self-excitation and the turbine speed, and maximum power is supplied to the motors. As explained hereinbefore, the field shunting switches 56 and 66 function to shunt the field windings of the motors, thereby increasing the motor speed to the maximum speed of the locomotive.

Under normal operation, when it is desired to stop the locomotive at a station, the controller MC is returned to the "idle" position, thereby removing excitation from the generators, but reducing the speed of the turbine to only approximately 60% of its full speed. The locomotive may be accelerated in the manner previously described by actuating the controller from the "idle" to the "full speed" position. If it is desired to stop the turbine, the controller is actuated to the "off" position which closes the valve 16 in the manner previously described.

From the foregoing description, it is apparent that I have provided a system which is particularly suitable for controlling the operation of locomotives in which the traction motors are supplied with power from generators driven by a steam turbine or other prime mover having similar operating characteristics. The control system is such that the excitation of the generators and the turbine speed are so correlated that maximum efficiency of the machines is obtained. Furthermore, the system is so constructed that any one of the plurality of power units may be disconnected without disturbing the operation of the remaining unit or units.

Since numerous changes may be made in the above-described construction and different embodiments of the invention may be made without departing from the spirit and scope thereof, it is intended that all matter contained in the above description and shown in the accompanying drawing shall be considered as illustrative and not in a limiting sense.

I claim as my invention:

1. In a control system, in combination, a prime mover, a generator driven by the prime mover, a traction motor connected to the generator, a separately-excited field winding and a self-excited field winding for the generator, a source of power for the separately-excited field winding, control means for controlling the excitation of the separately-excited field winding, additional control means for controlling the speed of the prime mover, a manually operable controller for controlling the operation of said control means to first increase the excitation of the separately-excited field winding by increments and then increase the speed of the prime mover without increasing said separate excitation, and relay means responsive to the voltage of the generator and cooperating with said controller to control the excitation of the self-excited field winding while the speed of the prime mover is being increased, thereby increasing the power supplied to the motor.

2. In a control system, in combination, a prime mover, a generator driven by the prime mover, a traction motor connected to the generator, a separately-excited field winding and a self-excited field winding for the generator, a source of power for the separately-excited field winding, switching means for connecting said power source to the separately-excited field winding, a manually operable controller for controlling the operation of said switching means, said controller being operable to first increase the excitation of said separately-excited field winding by increments and then increase the speed of the prime mover without increasing said separate excitation, and relay means responsive to the voltage of the generator and cooperating with said controller to control the excitation of the self-excited field winding while the speed of the prime mover is being increased, thereby increasing the voltage applied to the motor.

3. In a control system, in combination, a prime mover, a generator driven by the prime mover, a traction motor connected to the generator, a separately-excited field winding and a self-excited field winding for the generator, a source of power for the separately-excited field winding, switching means for connecting said power source to the separately-excited field winding, control means for controlling the excitation of the separately-excited field winding, additional control means for controlling the speed of the prime mover, a manually operable controller for controlling the operation of said switching means and said control means to first increase the excitation of the separately-excited field winding by increments and then increase the speed of the prime mover without increasing said separate excitation, and relay means responsive to the voltage of the generator and cooperating with said controller to control the excitation of the self-excited field winding while the speed of the prime mover is being increased, thereby increasing the power supplied to the motor.

4. In a control system, in combination, a prime mover, a generator driven by the prime mover, a traction motor connected to the generator, said generator having a separately-excited field winding and a self-excited field winding, a source of power for the separately-excited field winding, switching means for connecting the source of power to the separately-excited field winding, additional switching means for connecting the self-excited field winding across the generator, a master controller for controlling the operation of said switching means and the speed of the prime mover, and relay means responsive to the voltage of the generator and cooperating with said controller to control the excitation of the self-excited field winding while the speed of the prime mover is being increased.

5. In a control system, in combination, a prime mover, a generator driven by the prime mover, a traction motor connected to the generator, said generator having a separately-excited field winding and a self-excited field winding, a source of power for the separately-excited field winding, switching means for connecting the source of power to the separately-excited field winding, additional switching means for connecting the self-excited field winding across the generator, a master controller for controlling the operation of said switching means and the speed of the prime mover, said controller being operable first to increase the excitation of the separately-excited field winding by increments and then increase the speed of the prime mover, and relay means responsive to the voltage of the generator and cooperating with said controller to control the excitation of the self-excited field winding while the speed of the prime mover is being increased.

6. In a control system, in combination, a prime mover, a generator driven by the prime mover, a traction motor connected to the generator, said generator having a separately-excited field winding and a self-excited field winding, a source of power for the separately-excited field winding, switching means for connecting the source of power to the separately-excited field winding, additional switching means for connecting the self-excited field winding across the generator, a master controller for controlling the operation of said switching means and the speed of the prime mover, said controller being operable first to increase the excitation of the separately-excited field winding by increments and then increase the speed of the prime mover, regulating resistors for controlling the excitation of the self-excited field winding, and relay means responsive to the voltage of the generator and cooperating with said controller to vary said regulating resistors to increase the self-excitation of the generator while the speed of the prime mover is being increased.

7. In a control system, in combination, a prime mover, a plurality of generators driven by the prime mover, a plurality of traction motors supplied by each generator, switching means for connecting said motors to their respective generators, a separately-excited field winding and a self-excited field winding for each generator, a source of power for the separately-excited field windings, switching means associated with said first-named switching means for disconnecting the separately-excited field winding and the self-excited field winding for a generator from said power source and said generator respectively when the motors supplied by said generator are disconnected from said generator, a resistor connected to said power source by the switching means for disconnecting the separately-excited field winding for a generator when said separately-excited field winding is disconnected from said power source, control means for controlling the excitation of the separately-excited field windings, additional control means for controlling the speed of the prime mover, and a manually operable controller for controlling the operation of said control means to first increase the excitation of the separately-excited field windings by increments and then increase the speed of the prime mover without increasing said excitation, thereby increasing the power supplied to the motors.

CYRIL E. BASTON.

REFERENCES CITED

The following references are of record in the file of this patent:

UNITED STATES PATENTS

| Number | Name | Date |
|---|---|---|
| 1,829,222 | Jupp et al. | Oct. 27, 1931 |
| 1,929,089 | Boveri et al. | Oct. 3, 1933 |
| 1,949,216 | McNairy | Feb. 27, 1934 |
| 2,195,766 | Courcoulas | Apr. 2, 1940 |
| 2,231,521 | Curry | Feb. 11, 1941 |
| 2,245,083 | Webb et al. | June 10, 1941 |
| 2,290,867 | Curry | July 28, 1942 |